(12) United States Patent
Vansickle et al.

(10) Patent No.: US 11,591,844 B2
(45) Date of Patent: Feb. 28, 2023

(54) UNIVERSAL WINDOW BANDING CLIP SYSTEM

(71) Applicant: PEERLESS PRODUCTS, INC., Fort Scott, KS (US)

(72) Inventors: Jordan B. Vansickle, Fort Scott, KS (US); Joshua R. Mintz, Fort Scott, KS (US)

(73) Assignee: Peerless Products, Inc., Fort Scott, KS (US)

( * ) Notice: Subject to any disclaimer, the term of this patent is extended or adjusted under 35 U.S.C. 154(b) by 29 days.

(21) Appl. No.: 17/352,545

(22) Filed: Jun. 21, 2021

(65) Prior Publication Data
US 2021/0310296 A1 Oct. 7, 2021

Related U.S. Application Data

(62) Division of application No. 16/834,336, filed on Mar. 30, 2020, now Pat. No. 11,078,714.

(51) Int. Cl.
*E06B 1/60* (2006.01)
*E06B 3/06* (2006.01)
(Continued)

(52) U.S. Cl.
CPC .............. *E06B 1/6007* (2013.01); *E06B 3/06* (2013.01); *E06B 7/16* (2013.01); *F16B 45/00* (2013.01); *Y10T 24/4755* (2015.01)

(58) Field of Classification Search
CPC . E06B 1/6007; E06B 3/06; E06B 7/16; E06B 3/5814; E06B 7/28; F16B 45/00;
(Continued)

(56) References Cited

U.S. PATENT DOCUMENTS 2,547,799 A 4/1951 Wernig
2,655,239 A 10/1953 Hobart
(Continued)

OTHER PUBLICATIONS

Canadian Application No. 196731, Office Action dated Nov. 4, 2021, 1 page.
(Continued)

*Primary Examiner* — Robert Sandy
*Assistant Examiner* — Louis A Mercado
(74) *Attorney, Agent, or Firm* — Lathrop GPM LLP

(57) ABSTRACT

A system for improving the alignment of building product frame members. The system includes a first and second clip member each with an arcuate edge releasably positioned into a channel within the opposed frame members. A longitudinally extending banding strap looped through openings in both first and second clip member. The first end of the longitudinally extending banding strap is inserted into a banding strap tensioning apparatus and tension is applied to the first end as well as to a longitudinally disposed segment of the banding strap that is also inserted into the banding strap tensioning apparatus. Once the specified span is achieved, the overlapping first end and longitudinally disposed segment are bonded together using the banding member tensioning apparatus thereby preventing movement of the first and second frame members away from one another. Sealant is applied to the frame members and the banding strap clip members are removed.

7 Claims, 9 Drawing Sheets

(51) Int. Cl.
*E06B 7/16* (2006.01)
*F16B 45/00* (2006.01)

(58) Field of Classification Search
CPC ........ F16B 2/08; Y10T 24/4755; Y10T 24/31; Y10T 24/318; Y10T 24/3484; Y10T 24/3416
See application file for complete search history.

(56) References Cited

U.S. PATENT DOCUMENTS

| | | | |
|---|---|---|---|
| 2,976,972 A | | 3/1961 | Raymond |
| 3,242,627 A | | 3/1966 | Fountain |
| 3,566,570 A | * | 3/1971 | Evans ................... E06B 3/5828 52/775 |
| 3,976,234 A | * | 8/1976 | Moudry ................. B65D 63/10 24/302 |
| 4,500,240 A | | 2/1985 | Moran |
| D315,864 S | | 4/1991 | Embree |
| D371,006 S | | 6/1996 | Walker |
| D457,427 S | | 5/2002 | Diaz |
| D596,482 S | | 7/2009 | Marinucci |
| D619,451 S | | 7/2010 | Carlesso |
| D639,707 S | | 6/2011 | Caskey |
| D641,153 S | | 7/2011 | van den Hurk |
| D675,907 S | | 2/2013 | Yoo |
| D680,903 S | | 4/2013 | Chan |
| D685,991 S | | 7/2013 | Pearce |
| D778,508 S | | 2/2017 | Moreau |
| 10,159,378 B1 | | 12/2018 | Orban |
| 10,486,582 B1 | * | 11/2019 | Hamm ................... B60P 7/0846 |
| 11,078,714 B1 | | 8/2021 | Vansickle |
| D947,661 S | * | 4/2022 | Vansickle ...................... D8/394 |
| 2010/0096531 A1 | | 4/2010 | Morrison |
| 2010/0115741 A1 | | 5/2010 | Trifari |
| 2011/0056054 A1 | | 3/2011 | Moffatt |
| 2011/0089226 A1 | | 4/2011 | Morrison |
| 2011/0258817 A1 | | 10/2011 | Usher |
| 2014/0165343 A1 | | 6/2014 | Gibbs |
| 2015/0024230 A1 | | 1/2015 | Wark |
| 2018/0352978 A1 | | 12/2018 | Slevin-Giesler |

OTHER PUBLICATIONS

U.S. Appl. No. 29/719,896, Ex Parte Quayle dated Nov. 22, 2021, 6 pages.

* cited by examiner

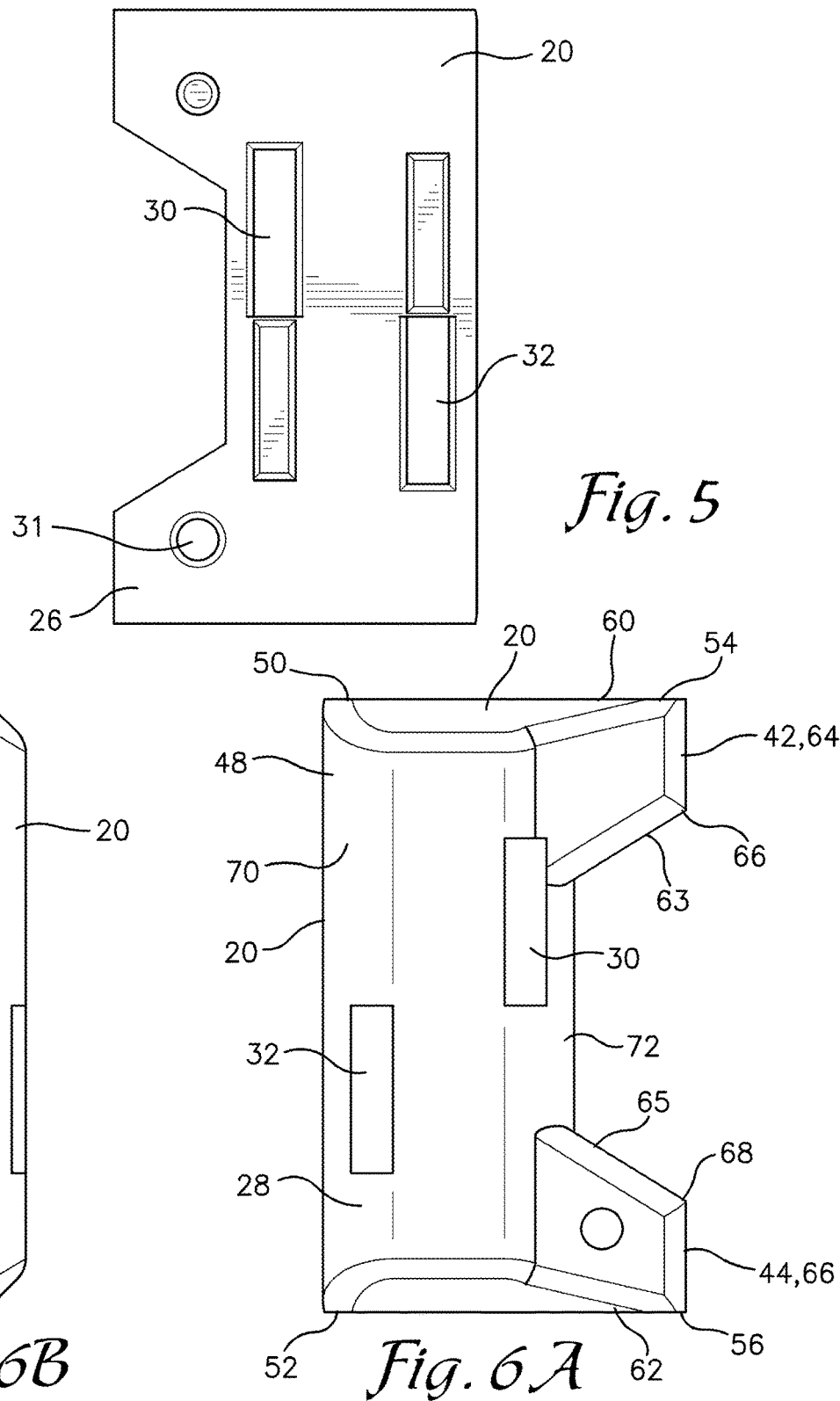

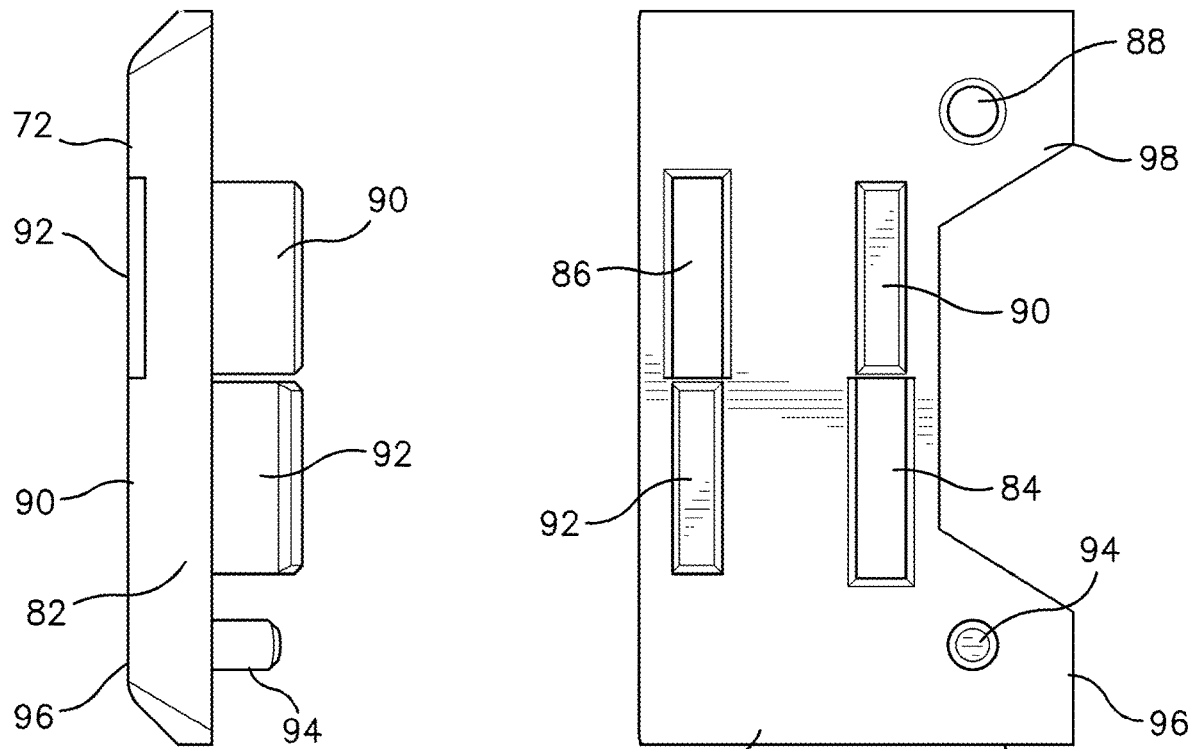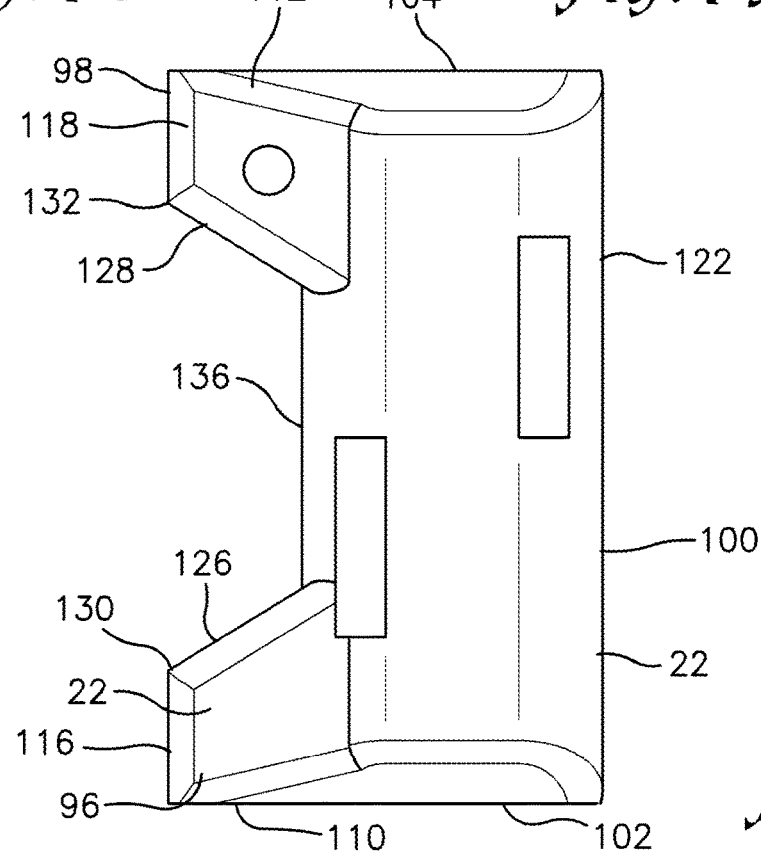

UNIVERSAL WINDOW BANDING CLIP SYSTEM

RELATED APPLICATION

This application is a divisional application of U.S. application Ser. No. 16/834,336 filed on Mar. 30, 2020, now U.S. Pat. No. 11,078,714.

FIELD OF THE DISCLOSURE

This disclosure is directed to a system for employing a pair of universal banding clips to holding two window extrusions together in a parallel configuration while applied sealant cures.

BACKGROUND

The fabrication of windows has become a highly competitive industry with substantial investments made in the equipment and facilities required to assemble the windows. In addition, the design of windows has grown more complex with the utilization of multiple layers of glass with increasing thermal resistance capabilities, the utilization of inert gases between glass panels to retard heat transfer as well as features that seal against wind and moisture intrusion from wind driven rain.

The tolerances on these windows is now tighter than ever and fabrication of these high-performance windows must follow strict protocols and employ techniques that help to maintain the shape of the window components while materials, such as sealants used in the fabrication process are able to fully cure without being subjected to forces that may pull the sealant bead away from the surfaces that the bead is intended to span and seal against air and moisture intrusion. Importantly, windows must remain within tolerances established by the American Architectural Manufacturing Association and must be properly fabricated to design dimensions to be compatible with the building penetration dimensions provided by the building owner.

It is common for the window frame elements, typically extruded aluminum members to bow away from one another in an undesirable fashion. Specifically, the ends of the frame elements are locked into position through their attachment with the ends of the other frame members; however, the center of the span of the frame elements will have bowed outwardly away from the frame member that is located opposite to it. This bowing is typically due to residual stress that remains within the aluminum after the frame member is extruded. The frame element bowing must be remedied otherwise the window unit may not fit within the building penetration thus creating additional, and highly undesirable, work for the window installation team.

Following the fabrication process when the window sealant is undergoing the curing process even such basic occurrences as temperature and humidity changes can lead to uncured sealant being pulled away from frame surfaces. In addition, external forces applied to the fabricated window such as inadvertent impacts, vertical stacking of adjacent windows or even the weight of the window components themselves can lead to bowing and bending of structural components of the window that can result in sealant pulling away from a surface to which it has not fully bonded.

SUMMARY

The universal window banding clip apparatus and system disclosed herein is configured for hooking engagement to an internal channel, i.e., for securing a gasket in position, of a frame member of a building product, such as a window or a door with a window, wherein a band with a first and second end is routed through the cutout (opening) in a first banding clip and the second end of the band is routed through the cutout (opening) in the second banding clip disposed on an opposite side of the window. The first and second ends of the band are then pulled toward one another, using a banding apparatus, thereby providing a force to the two banding clips that is imparted to the window structure. This force imparted to the two oppositely disposed clips is beneficial post assembly of the window by bringing the two frame members to the proper separation distance as measured at designated reference locations.

The apparatus and system disclosed herein is directed to a universal clip assembly for restraining in position two oppositely disposed window frame members during fabrication until sealant applied to the interface between the glazing unit (glass installed into the window or door) and the frame members fully cures.

The clip apparatus, as detailed in a preferred embodiment below, includes an upper panel with an exterior surface and an interior surface. The upper panel includes at least one opening between the interior and exterior surface and at least one protrusion extending outwardly from the interior surface. The upper panel also includes a main body with longitudinally disposed ends and laterally extending projections proximate the longitudinally disposed ends.

The clip apparatus also includes a lower panel with an exterior surface and an interior surface, at least one opening between the interior surface and exterior surface and at least one protrusion extending outwardly from the interior surface. The lower panel also includes a main body with longitudinally disposed ends and laterally extending projections proximate the longitudinally disposed ends.

The clip apparatus further includes a hook plate with first and second longitudinally opposed edges, the second edge is an arcuately shaped edge segment. In addition, the hook plate utilizes first and second laterally opposed edges and a through hole proximate each of the laterally opposed edges. The hook plate first longitudinally opposed edge is preferably positioned between the upper and lower locking panels; however, the first edge may also extend beyond the upper and lower locking panels.

The interior surfaces of the upper and locking panels are configured to face one another and the at least one protrusion from each of the upper and lower panels passes through the at least one opening in the opposite panel producing a clip apparatus with two halves that do not slide relative to one another due to the protrusion passing through the opening.

The upper and lower longitudinally extending projections proximate the laterally disposed edges as detailed above, have three surfaces interior to the cutout. The first surface is parallel to the hook plate arcuate shaped second longitudinally opposed edge. The second and third surfaces are canted in relation to the first surface wherein the cant of the second and third surfaces relative to the first surface is in the range of about 30-50 degrees.

In operation, the arcuate hook of the second longitudinally opposed edge of the hook plate of the universal window banding clip is captured within an internal channel of a frame member, such as on a first side jamb. The arcuate hook of a second banding clip is inserted into the internal channel of a second side jamb. A thin banding strap, preferably fabricated from plastic, is manually passed through the cutout in the first banding clip.

The other end of the thin band is passed through the cutout of the second banding clip on the opposite side of the window. The thin banding strip wrapped around both banding clips is positioned against the first surface interior to the cutout. This first surface is wider than the hook plate and is far less likely to cut the thin band than is the thin, hard metal hook plate even if there is vibratory movement of the band during transit. Tension is applied to the second end of the band after it has been threaded through the banding clip cutout. Once the desired amount of tension exists on the band and the side jambs are separated by the distance set forth in the design specifications, the second end of the band is crimped onto the first end of the banding clip.

It is an object of the universal window banding clip system to prevent the bowing of window frame components away from one another during the sealant curing process.

It is a further object of the universal window banding clip system to prevent bowing of the window frame components while relying upon an inexpensive clip design.

It is a further object of the universal window banding clip system to reduce the potential for the banding clip to sever the banding material.

It is a further object of the universal window banding clip system to utilize an uncomplicated easy to fabricate design.

These embodiments are intended to be within the scope of the invention herein disclosed. These and other embodiments of the present invention will become clear to those skilled in the art from the following detailed description of the preferred embodiments having reference to the attached figures, the invention not being limited to any preferred embodiment disclosed.

Various objects, features, aspects and advantages of the disclosed subject matter will become more apparent from the following detailed description of preferred embodiments, along with the accompanying drawings in which like numerals represent like components. The contents of this summary section are provided only as a simplified introduction to the disclosure, and are not intended to be used to limit the scope of the appended claims.

BRIEF DESCRIPTION OF THE DRAWINGS

FIG. 5 illustrates an elevation view of an embodiment of the interior surface of the upper panel;

FIG. 6A illustrates an elevation view of an embodiment of the exterior surface of the upper panel;

FIG. 6B illustrates a side elevation view of an embodiment of the upper panel;

FIG. 7A illustrates an elevation view of an embodiment of the interior surface of the lower panel;

FIG. 7B illustrates a side elevation view of an embodiment of the lower panel;

FIG. 8 illustrates an elevation view of an embodiment of the exterior surface of the lower panel;

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

Figure 1:
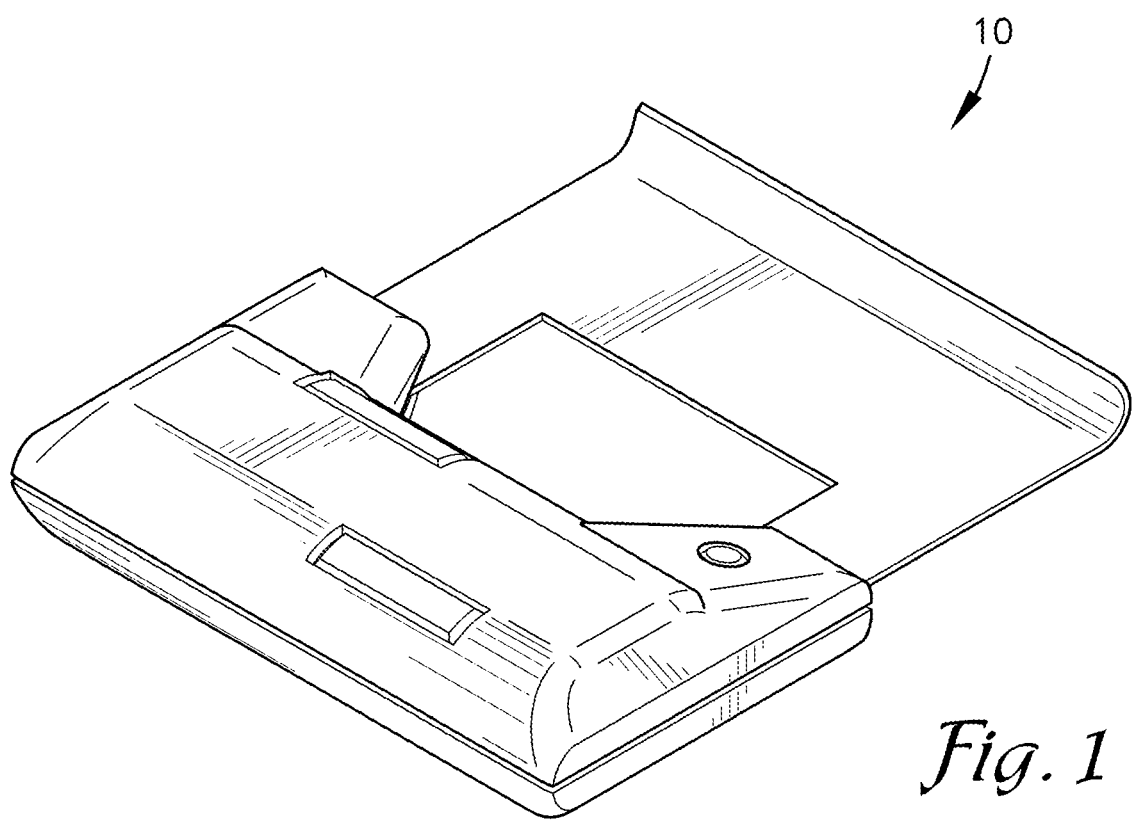
FIG. 1 illustrates a perspective view of an embodiment of universal window banding clip as disclosed herein.
Figure 2:
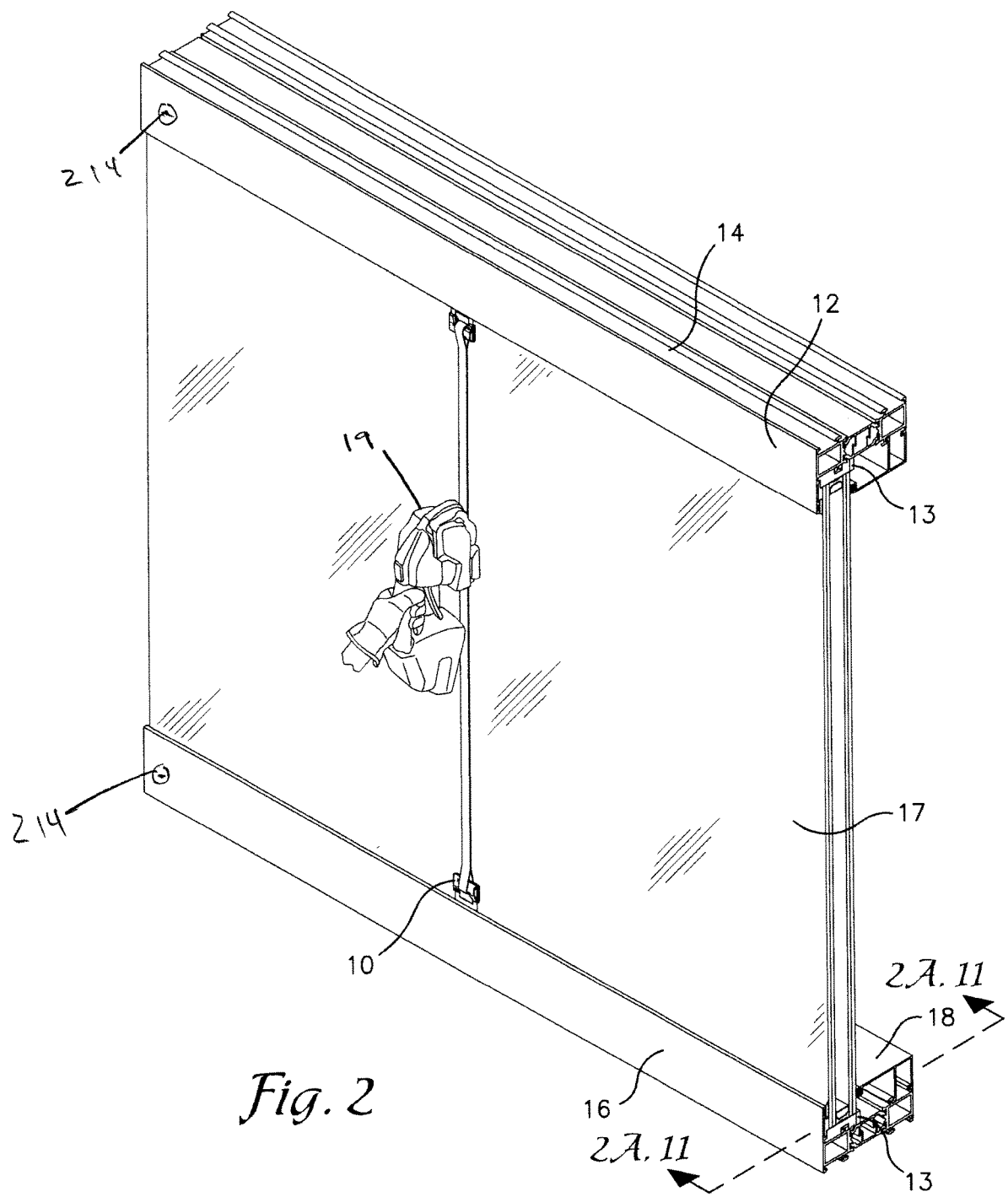
FIG. 2 illustrates a view of an embodiment of two banding clips and a banding strap in position on a window.

FIG. 1 illustrates a perspective view of an embodiment of the universal window banding clip 10 while FIG. 2 illustrates a view of two banding clips 10 in operation upon a window frame 12 to provide the user with a sense of how the universal banding clip is employed in service. As will be discussed in greater detail below, a banding clip is removably secured to two window frame members and a banding strap is passed through an opening in each banding clip with the banding strap wrapped around a surface interior to the cutout. An exemplary commercially available tensioning apparatus 19, is a model BXT3-16 battery powered poly strapping tool manufactured by SIGNODE. The operability of this device with banding straps is well known in the industry. This disclosure is not limited to the SIGNODE tensioning apparatus disclosed above and other vendors provide devices that are capable of properly performing the disclosed function.

The tensioning apparatus, applies a force to the two ends of the band, or more preferably to proximate a first end of the strapping band, where it can obtain a strong grip on the band and simultaneously a segment of the strapping band that is longitudinally separated from the already captured first end of the strapping band that has passed through the openings 162 in both banding clips. The tensioning device is operable to slide in opposite directions the first end of the strap and the captured segment of the band 210. In operation, the tensioning device then applies tension to near the first end, and pulls the two clips that are engaged with the window frame members together so that span design specifications can be realized.

The strapping tool provides the capability to apply variable tension speed that is controlled by finger pressure. This tool capability allows the operator to apply tension at a measured rate to easily control the change in separation of the frame members as will be discussed in greater detail below. The use of the term "banding strap" should not be construed to be limited to only a thin plastic band. The banding strap as disclosed herein should properly be construed to also mean a rope or a cable and be fabricated from materials other than plastic, such as hemp and metal.

Figure 2A:
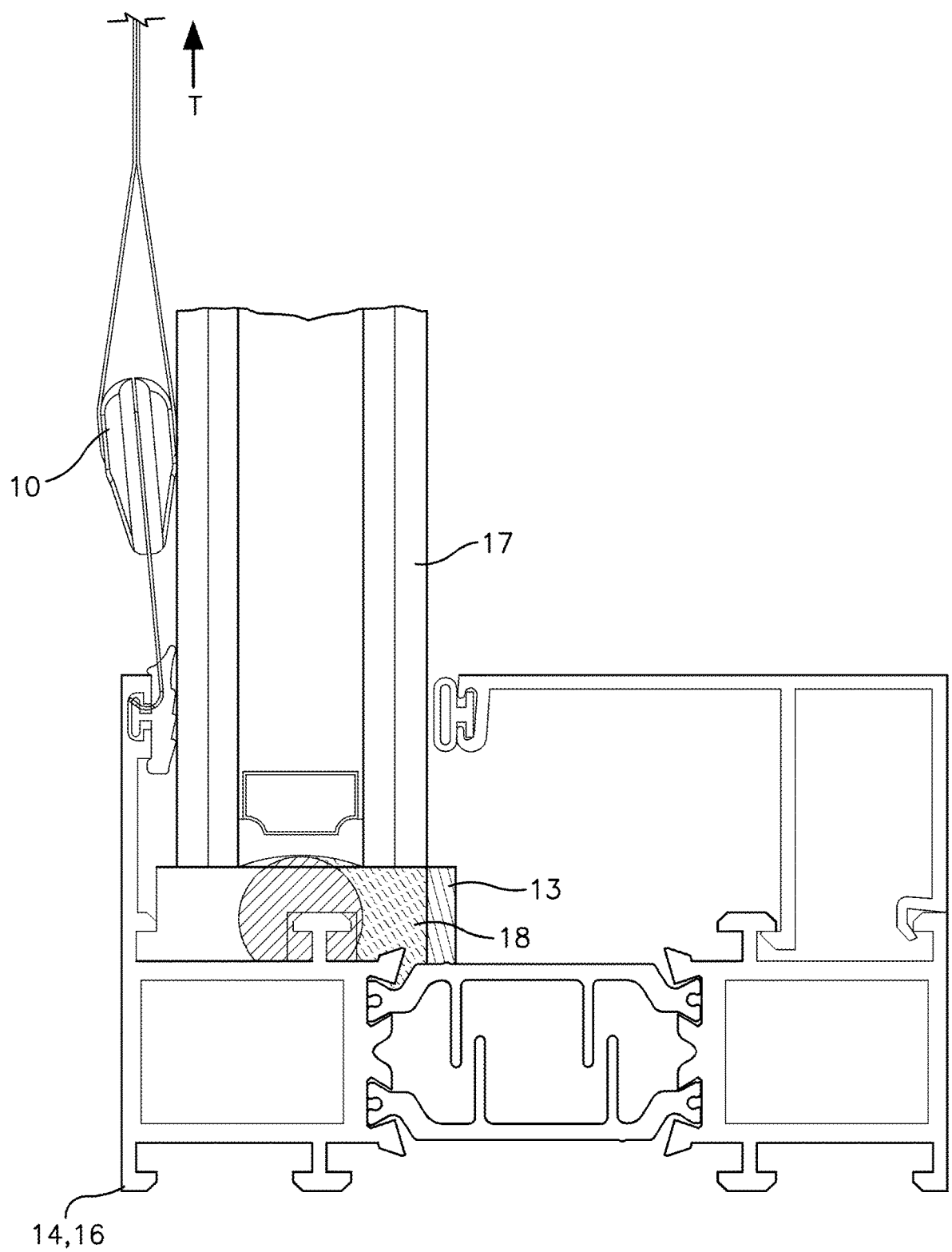
FIG. 2A illustrates a view a view of the window frame along lines 2A-2A of FIG. 1 with an embodiment of the banding clip engaged in an internal glazing channel within the window frame.
Figure 3:
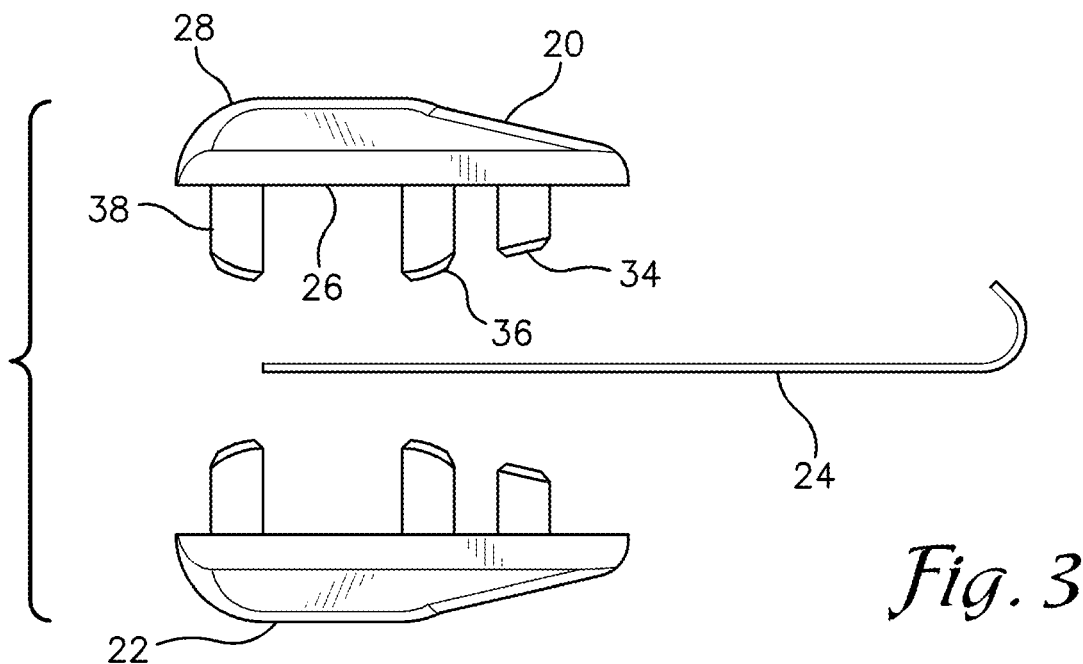
FIG. 3 illustrates a side elevation view of embodiments of the three components comprising the banding clip prior to assembly.
Figure 4:
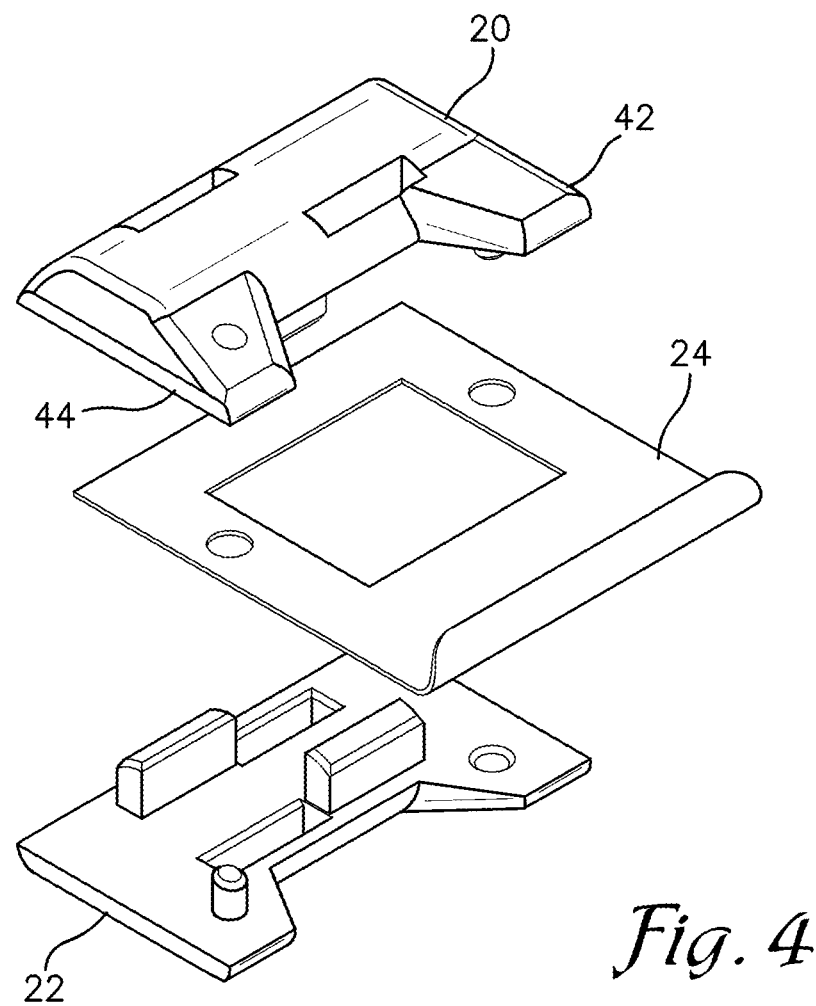
FIG. 4 illustrates a perspective view of embodiments of the three components comprising the banding clip prior to assembly.

As seen in FIGS. 2 and 2A, the universal clip 10 is utilized for restraining in position, post assembly of the window in a door, or a stand-alone window, two extruded engineered plastic or metal frame members 14, 16, such as those circumscribing a glazing in a door, or a stand-alone glass set, or other material, made to be set in a frame, also known as a glazing 17, until a glazing bead 18 applied to the intersection 13 of the frame members 14, 16 and the glazing 17 fully cures. The universal clip 10 as seen in FIGS. 3 and 4 comprises three separate major components to include an upper panel 20, a lower panel 22 and a hook plate 24.

As detailed in FIGS. 5 and 6A, 6B the upper panel 20 as disclosed herein includes an interior surface 26 and an exterior surface 28. As seen in FIG. 5, upper panel 20 has at least one, and preferably three openings 30, 31, 32 extending between the interior 26 surface and exterior surface 28 and, as seen in FIG. 3 at least one protrusion, and in a preferred embodiment, three protrusions 34, 36, 38 extend outwardly from the interior surface 26. Two of the protrusions 36, 38 are preferably rectangular in cross-section; however, this rectangular preference should not be considered as limiting as a wide range of configurations may be functionally equivalent. The third protrusion 34 is preferably circular in cross section and resides atop one of the two laterally extending projections 42, 44.

As seen in FIGS. 6A and 6B, the upper panel 20 comprises a main body 48 with laterally opposed edges 50, 52 and longitudinally extending projections 42, 44 proximate the laterally opposed ends. The longitudinally extending projections 42, 44 each have one edge 60, 62 that is coterminous with the laterally opposed edges 50, 52 of the upper panel 20. The outbound edges 64, 66 of the longitudinally extending projections 54, 56 are preferably parallel to the back edge 70 of the upper panel 20.

Two canted edges 63, 65 span from the inside corners 66, 68 of the outbound edges 54, 56 preferably at an angle in the range of about 40 to 70 degrees relative to the front edge 72 at which they terminate. The front edge 72 spans between the two canted edges 63, 65. In the disclosed embodiment, the front edge 72 is parallel to the back edge 70. The upper panel is preferably fabricated from an engineering plastic that is molded to the desired configuration.

Located beneath the upper locking panel 20 is the lower panel 22 that closely replicates the upper panel 20. The lower panel 22, as seen in FIGS. 7A and 7B comprises an interior surface 80 and an exterior surface 82, at least one opening, and preferably three openings 84, 86, 88 that span between the interior surface 80 and exterior surface 82 and at least one, and preferably three protrusions 90, 92, 94 that extend upwardly from the interior surface 80. Two of the protrusions 90, 92 are preferably rectangular in cross-section; however, this configuration preference should not be considered limiting as a wide range of configurations are fully functional. The third protrusion 94 is preferably circular in cross-section and resides atop one of the two longitudinally extending projections 96, 98.

As seen in FIG. 8, the lower panel 22 comprises a main body 100 with laterally opposed edges 102, 104 and longitudinally extending projections 96, 98 proximate the laterally opposed edges. The longitudinally extending projections 96, 98 each have one edge 110, 112 that is coterminous with the laterally opposed edges 102, 104 of the lower panel 22. The outbound edges 116, 118 of the longitudinally extending projections 96, 98 are preferably parallel to the back edge 122 of the locking panel 22.

Two canted edges 126, 128 span from the inside corners 130, 132 of the outbound edges 116, 118 at an angle in the range of about 25 to 45 degrees, and preferably 32 degrees canted outwardly from perpendicular to the back edge 122 and terminate at a front edge 136 that spans between the two canted edges 126, 128. In the disclosed embodiment the front edge 136 is parallel to the back edge 122. The locking panel 22, as with the upper locking panel 20, is preferably fabricated from an engineering plastic that is molded to the desired configuration.

Figure 9A:
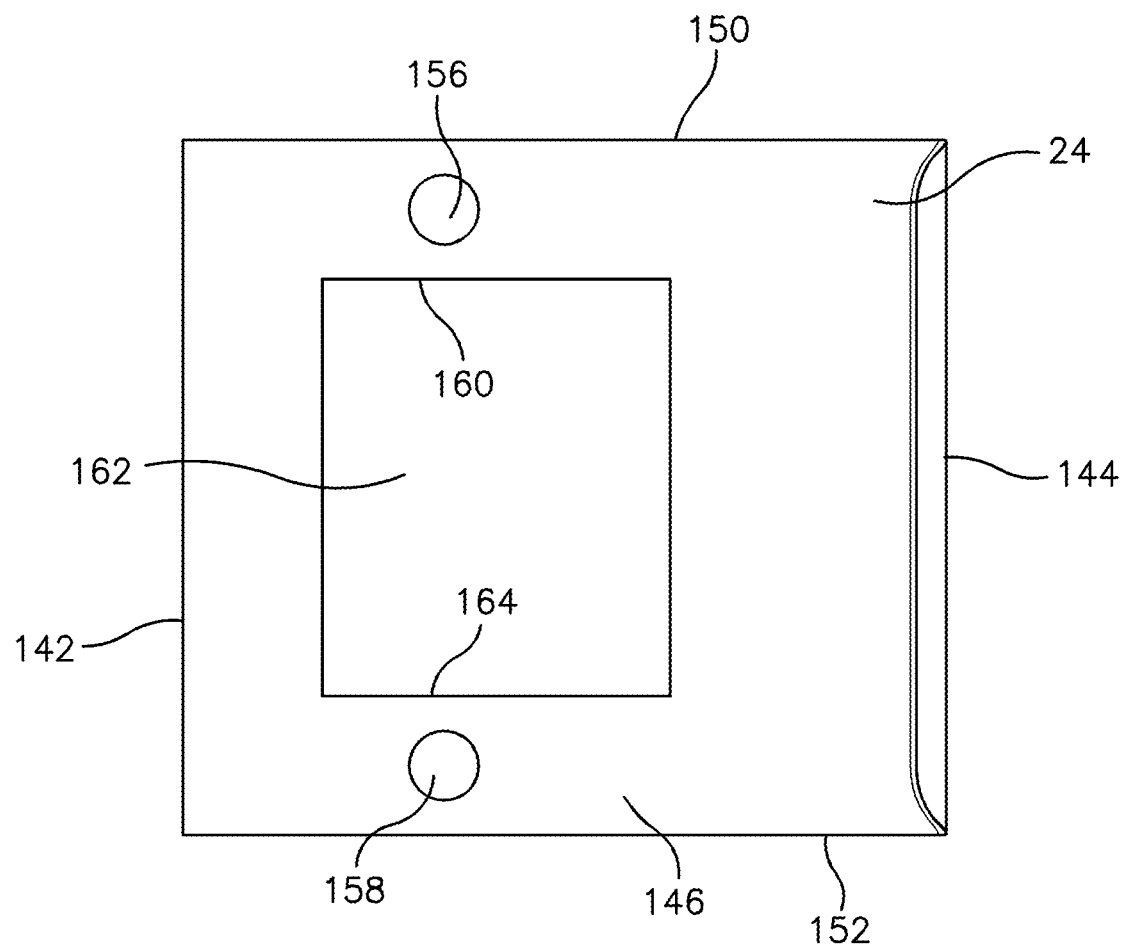
FIG. 9A illustrates a front elevation view of an embodiment of the hook plate.
Figure 9B:
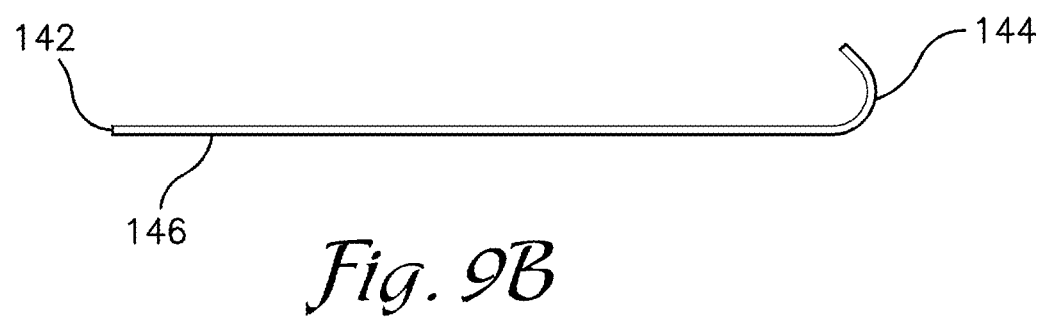
FIG. 9B illustrates a side elevation view of an embodiment of the hook plate.

The third major component of the banding clip 10, as seen in FIG. 9A, is the hook plate 24. The hook plate 24 is comprised of first and second longitudinally opposed edges 142, 144. As best seen in FIG. 9B, the second edge 144 is arcuately shaped with a roughly 45-degree angle relative to the main body 146 of the hook plate 24. The hook plate 24, as illustrated in FIG. 9A, also has first and second laterally opposed edges 150, 152 as well as a through hole 156, 158 proximate each of the laterally opposed edges 150, 152.

The hook plate 24, as seen in FIG. 9A, also includes a cutout 162 that is disposed roughly equidistantly from the first longitudinally disposed edge 142 and from the first and second laterally opposed edges 150, 152. The through holes 156, 158 are positioned roughly midway between the first and second laterally opposed interior edges 160, 164 and the first and second laterally opposed external edges 150, 152 of the hook plate 24. The hook plate 24 is preferably fabricated from stainless steel to provide corrosion resistance and is preferably heat treated to enhance the strength of the material as well.

One methodology to assemble the banding clip 10 is to position the hook plate 24 atop the lower panel 22 and to position the first longitudinally opposed edge 142 of the hook plate 24 proximate the back edge 70 of the lower panel 22. When in this orientation, the third protrusion 94 of the lower panel 22, which is preferably circular and resides atop one of the two longitudinally extending projections 96, 98 is received into the through hole 156 in the hook plate 24. The first protrusion 90 of the lower panel 22 resides nearest the rear edge 70 of the panel and serves to limit rotation of the hook plate 24 about the third protrusion 94 which is received into the hook plate 24 through hole 156.

Figure 10A:
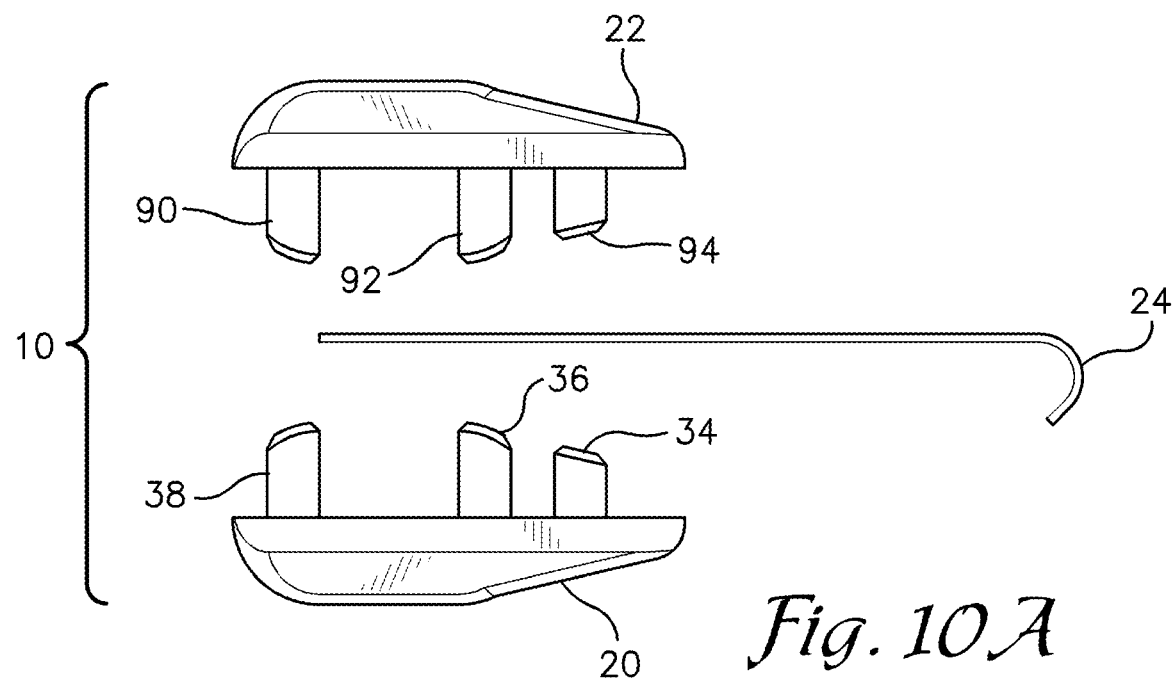
FIG. 10A illustrates a side elevation view of embodiments of the unassembled upper and lower locking panels with a hook plate disposed between the panels.
Figure 10B:
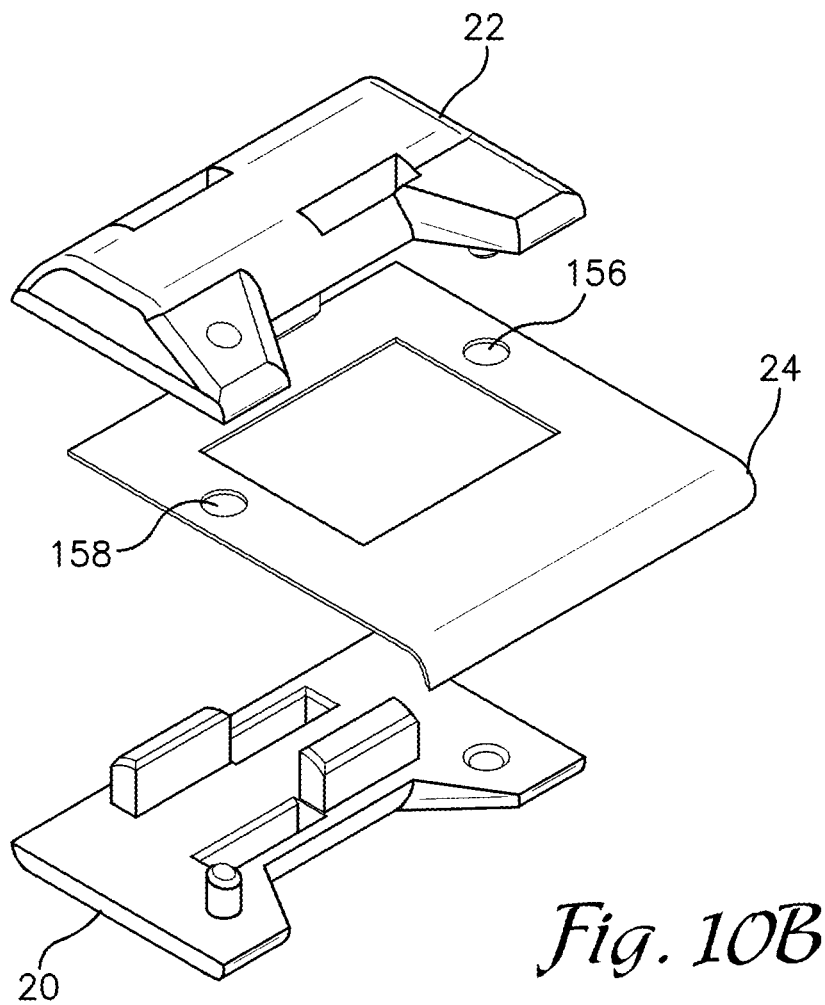
FIG. 10B illustrates a perspective view of embodiments of the unassembled upper and lower locking panels with a hook plate disposed between the locking panels.

As seen in FIGS. 10A and 10B (which reveal the clip 10 inverted, i.e., the lower locking plate 22 is on the top), once the hook plate 24 is stabilized in position atop the upper panel 20, the lower panel 22 is lowered into position over the hook plate 24 so that the protrusions 90, 92, 94 of the lower panel 22 are received into the round hole 158 in the hook plate 24 and the three openings 84, 86, 88 in the lower locking panel. As the protrusions 34, 36, 38 of the upper panel 20 are received into the opening 158 in the hook plate 24 and the three openings 30, 31, 32 of the lower panel 22, the protrusions 90, 92, 94 of the lower panel 22 are received into the opposite opening 156 of the hook plate 24 and into the openings 30, 31, 32 of the upper locking panel 20.

This inter-engagement of openings and protrusions between the upper and lower panels 20, 22 and the hook plate 24 serves to rigidly engage the three components together. The protrusions on each of the upper and lower locking panels 20, 22 are preferably friction fit into the openings in the opposite locking panel. The openings 156, 158 in the hook plate 24; however, are slightly oversized to allow unhindered passage of the upper and lower protrusions 34, 94 to pass through those openings without experiencing any frictional interference. The fully assembled universal window banding clip 10 components fit together tightly and snugly restrain the hook plate from release between the two locking panels.

Figure 11:
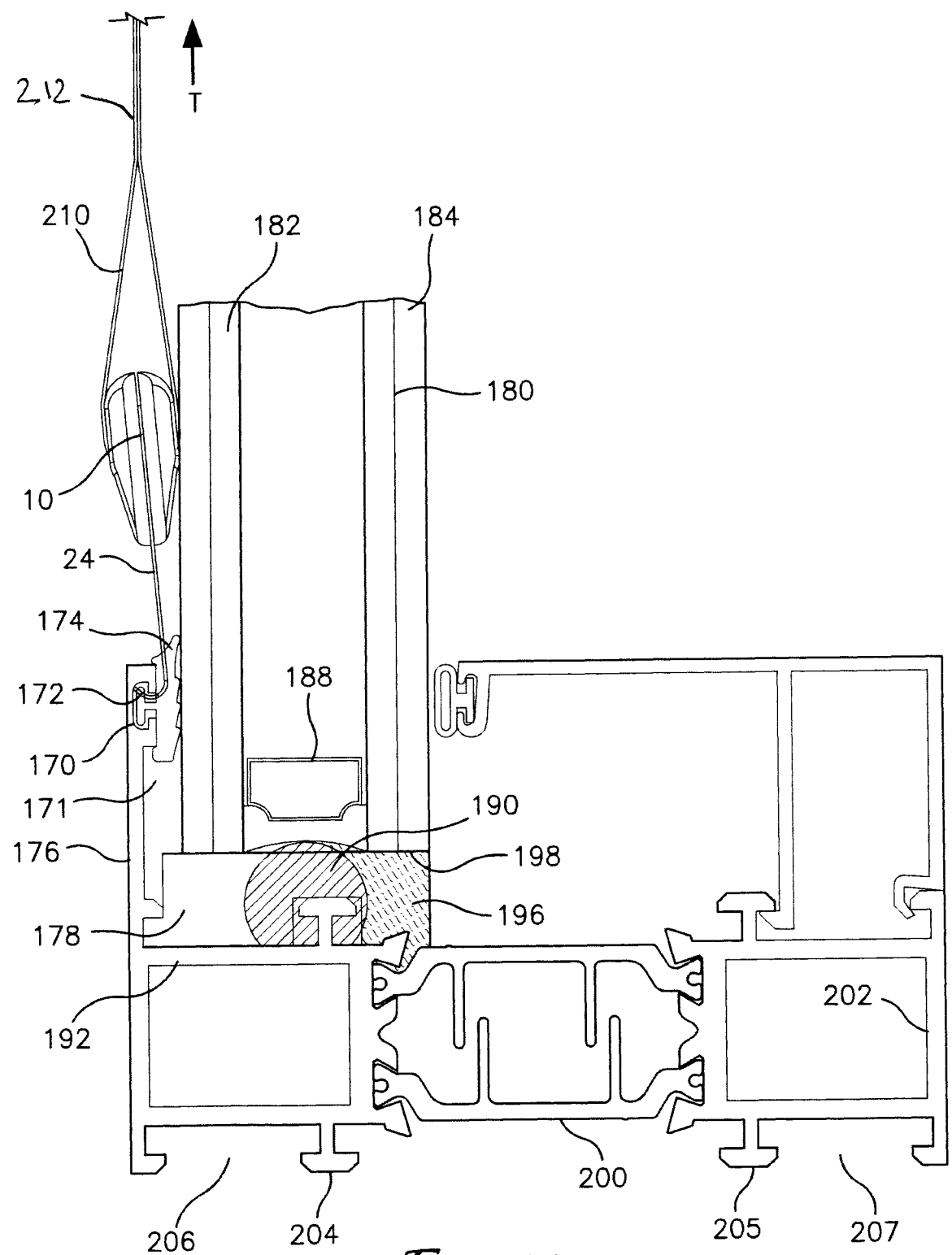
FIG. 11 illustrates a view of the window frame along lines 11-11 of FIG. 2 with an embodiment of the banding clip engaged in an internal glazing channel within the window frame.

In operation, as seen in cross-sectional view of FIG. 11, the arcuate hook edge 144 of the window banding clip 10 is inserted into the channel 170 within the internal glazing space 171 and is used to capture a retention flange 172 of the dry glaze gasket 174 in the exterior frame die 176. A glass setting block 178 is disposed beneath the insulating glass unit 180 that in this illustration is comprised of two sets of double pane glass 182, 184 that are separated by a spacer 188. A backer rod 190 is positioned beneath the spacer 188 and serves to provide additional insulating value to the insulating glass unit 180.

The glass setting block 178 is supported by a horizontal wall 192 of the exterior frame die 176 and at the interior facing lower edge 194 of the glass setting block 178 a sealant bead 196 is applied at the lower edge 198 of the interior facing double pane 184 of the insulating glass unit 180. The sealant bead 196 extends the entire lateral span of the window and it is with the aid of the installed banding clip system and method that the curing of this sealant bead 196 with all window components positioned in accordance with specifications is accomplished.

As also shown in FIG. 11, a thermal break 200 is interposed between the exterior frame die 176 and the interior frame die 202. The objective of the thermal break 200 being to limit the transfer of heat between the interior 202 and exterior 176 frame dies. Both the interior frame die 202 and the exterior frame die 176 utilize euro groove T-legs 204, 205 that are separated by the span of a euro-groove 206, 207. The T-legs 204 are used to engage the ribs of the receptor (not shown) into which the window unit is ultimately positioned. The T-legs 204, 205 engage with ribs that extend upwardly from the receptor frame which is a common feature in the window industry, and serve to prevent undesired horizontal movement of the window assembly once installed in the receptor.

As seen in FIG. 11, a thin and relatively narrow banding strap 210, preferably fabricated from plastic, is manually passed through the cutout 162 in the oppositely disposed first and second banding clip 10. The banding clips 10 being hooked into the channels 170 within the internal glazing spaces 171 and the first end 212 of the banding strap 210 is eventually bonded to the second end (not shown) of the banding strap 210.

In an alternative banding methodology, the end of the banding strap 210 is passed through the cutouts 162 in both banding clips 10. The banding strap 210 is then fed into the previously detailed band tensioning apparatus 19 and the end of the banding strap 210 is laid atop a longitudinally disposed portion of the banding strap and the band tensioning apparatus proceeds to grip both the end, or more precisely near the end of the strap, and the longitudinally disposed area of the banding strap 210 and move them away from one another. This movement by the band tensioning apparatus 19 applies tension to the band and pulls the two oppositely disposed clips (and frame members) closer to one another. The operator of the band tensioning apparatus 19 can finely tune the tension applied to the banding strap 210 thereby carefully adjusting the span between the frame members 14, 16. Once the frame members are spaced apart consistent with the design (blueprint) specifications, the operator proceeds to apply heat to the end of the banding strap 210 and the longitudinally disposed portion of the banding strap, with the band tensioning apparatus 19, and thereby bonding the end of the strap to the overlaid portion.

The banding strap now serves to hold tension on the two frame members 14, 16 preventing their movement away from one another.

The thin banding strap 210 passing through the cutout 162 on both banding clips 10 is positioned against the front edge 72, interior to the cutout 162. This front edge 72 of the banding clip 10 is considerably thicker than the hook plate 24, which is preferably only about 0.015 inches in thickness and the front edge 72 is far less likely to sever the banding strap 210 than is the thin hard metal hook plate 24.

The window frame elements 14, 16, as seen in FIG. 2, are generally fabricated from aluminum and tend to bow outwardly, away from one another, after installation of the glazing 17. This outward bowing must be restrained until the sealant bead 196, see FIG. 11, applied to the intersection of the lower edge 198 of the interior pane of glass 184 and the connection of the thermal break 200 to the exterior frame die 176 is fully cured. Since these frame elements 14, 16 bow outward, the tension applied to the banding strap 210 that is ultimately delivered to the two oppositely disposed banding clips tends to draw the banding clips toward one another. Each window that is fabricated has specified dimensions for the span between the window frame elements. For the window to be square these specified dimensions must be satisfied. As previously mentioned, the window framing elements tend not to be perfectly linear and are often bowed very slightly due to residual stresses from the extrusion process.

The window fabricator during window assembly, measures the span between various window components, e.g., exterior frame die elements 176, as seen in FIG. 11, and should that span be greater than what is specified by the design drawings, the tension force T is applied to the two ends of the band 210, or to the end of the band and the overlapping portion, to draw the two window components together to satisfy design tolerances. For example, as seen in FIG. 2, the span between the upper frame member 14 and the lower frame member 16 according to the specification may be 26.5 inches and the measured span is 26.7 inches. That span must be decreased by 0.2 inches to satisfy the design specification.

As the tension T is increased, the banding strap 210 passing through the cutout 162 in both banding clips 10 applies pressure to the edge 72. This tension force T is transferred to the arcuate shaped second longitudinally opposed edges 144 that are engaged in the channel 170 within the internal glazing space 171 as seen in FIG. 11. The tension force T applied to the two opposed channels 170 draws the two frame members 14, 16 together and decreases that span. Once the band tensioning apparatus has the span between the two frame members 14, 16 at the specified distance the band 182 is bonded against itself to hold the frame members in position. The sealant bead 196 applied at the lower edge 198 of the interior facing double pane 184 of the insulating glass unit 180 fully cures in about 30 days. Once the sealant bead 196 is cured it holds the window frame members 14, 16 in position as specified in the design drawings and counteracts the residual forces from the extrusion process that seeks to cause bowing of the frame members 14, 16.

There may exist scenarios where a sealant is not used to restrain the frame members into a position that has been achieved through realignment with the assistance of two or more banding clip members 10 and a banding strap. In those scenarios the clip members 10 are engaged with the first and second frame members 14, 16 as is described above. In addition, the banding strap is routed through the openings in the two banding clip members 10 and then tension is applied to the banding strap to reduce the span distance between reference points on the first and second frame members.

Instead of applying a sealant to the glazing and frame members once the desired span between the reference points is achieved, the alternative scenario is to apply anchoring members 214, i.e., fasteners as seen in FIG. 2, either threaded or unthreaded through the window frame members to secure them to a rigid substrate disposed behind the frame members or optionally to a glazing member that spans between the frame members. In this scenario, it is more likely that the glazing member positioned between the frame members is of a non-brittle nature, i.e., other than glass, so that fasteners can be placed through both the framing members and the glazing member without shattering the glass. Glazing materials contemplated in this scenario are wood panels, plywood, engineered plastics and polyvinyl chloride to name just a few.

Once the glazing member and frame members are properly secured in position with the fasteners and the specified span between the frame members has been achieved, the banding strap is removed and the banding clips are extracted from engagement with the first and second frame members. Because the fasteners penetrate both the frame members and the glazing element, preferably in multiple locations, the span between the frame members that was achieved with the banding clips and strap in position, does not change. The frame members are effectively anchored in position by these anchoring members (fasteners) without the need for the application of a sealant on the frame members and the glazing. The specified span between the frame members has been achieved and the frame members are locked into position.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings. Moreover, the order of the components detailed in the system may be modified without limiting the scope of the disclosure.

We claim:

1. A system for altering, and then restraining, a span distance between reference points on first and second building product frame members, the system comprising:
   a first clip member with an opening and an arcuate hook edge, the arcuate hook edge positioned into a channel of the first frame member;
   a second clip member with an opening and an arcuate hook edge, the arcuate hook edge positioned into a channel within an internal glazing space of the second frame member;
   a longitudinally extending banding strap with a first end and a second end, the first end passing through the opening in the first clip member, the second end passing through the opening in the second clip member;
   wherein:
   the first and second ends of the longitudinally extending banding strap overlap and are inserted into a banding strap tensioning apparatus and a tension force is applied to the first and second ends;
   the distance between the first and second frame members is measured at reference locations thereon to confirm a specified span between the frame members;
   once the specified span is achieved with an application of tension by the tensioning apparatus, the banding strap overlap are bonded together using the banding strap tensioning apparatus thereby preventing movement of the first and second frame members away from one another;
   sealant is applied to a line of contact between the frame members and glazing unit; and
   following curing of the sealant applied, the banding strap is removed from the first and second clip members.

2. The system of claim 1, wherein the banding strap tensioning apparatus bonds overlap the first and second ends of the banding strap with heat.

3. The system of claim 2, wherein the heat melts the first and second ends together.

4. A system for improving alignment of building product frame members, the system comprising:
   a first clip member with a cutout and an arcuate hook edge, the arcuate hook edge positioned into a channel within the frame member;
   a second clip member with a cutout and an arcuate hook edge, the arcuate hook edge positioned into a channel within the frame member;
   a longitudinally extending banding strap with a first end, the first end passing through the cutouts in both the first and second clip members;
   wherein:
   the first end of the longitudinally extending banding strap is inserted into a banding strap tensioning apparatus and a tension force is applied to the first end as well as to a longitudinally disposed segment of the banding strap that is also inserted into the banding strap tensioning apparatus;
   a distance between a first and second frame members is measured at reference locations thereon to confirm a specified span between the frame members;
   the tensioning apparatus applies an opposing force to each of the first end and to the longitudinally disposed segment to draw the first and second clip members toward one another to obtain the specified span;
   once the specified span is achieved, overlap the first end and the longitudinally disposed segment using the banding strap tensioning apparatus thereby preventing movement of the first and second frame members away from one another;
   application of a sealant to a line of contact between the frame members and glazing unit; wherein upon curing of the sealant applied, removing the banding strap and the first and second clip members.

5. A system for altering, and then restraining, a span distance between reference points on first and second building product frame members, the system comprising:
   a first clip member with a cutout and an arcuate hook edge, the arcuate hook edge positioned into a channel within the first frame member;
   a second clip member with a cutout and an arcuate hook edge, the arcuate hook edge positioned into a channel within the second frame member;
   a longitudinally extending banding strap with a first end, the first end passing through the cutouts in both the first and second clip members;
   wherein:

the first end of the longitudinally extending banding strap is inserted into a banding strap tensioning apparatus and a tension force is applied to the first end as well as to a longitudinally disposed segment of the banding strap that is also inserted into the banding strap tensioning apparatus;

the distance between the first and second frame members is measured at reference locations thereon to determine a span between the frame members;

the tensioning apparatus applies an opposing force to each of the first end and to the longitudinally disposed segment to draw the first and second clip members toward one another to obtain a specified span;

once the specified span is achieved, overlap the first end and the longitudinally disposed segment together using the banding strap tensioning apparatus thereby preventing movement of the first and second frame members away from one another;

placement of anchoring members into the first and second building product frame members to anchor them into position against at least one of a substrate and a glazing member; and removal of the banding strap and the first and second clip members.

6. The system of claim 5, wherein the anchoring members are at least one of threaded fasteners and unthreaded fasteners.

7. The system of claim 5, wherein the glazing member is comprised of at least one of an engineered plastic, wood, plywood and metal.

\* \* \* \* \*